United States Patent [19]
Van Ostrom et al.

[11] 3,709,567
[45] Jan. 9, 1973

[54] ADAPTIVE CONTROL ANTI-LOCK BRAKE SYSTEM

[75] Inventors: David L. Van Ostrom; Douglas W. Sweet; David G. Beyerlein, all of Flint, Mich.

[73] Assignee: General Motors Corporation, Detroit, Mich.

[22] Filed: March 26, 1971

[21] Appl. No.: 128,484

Related U.S. Application Data

[63] Continuation of Ser. No. 806,807, March 13, 1969, abandoned.

[52] U.S. Cl.............303/21 BE, 303/20, 303/21 AF, 303/21 P
[51] Int. Cl. ...............................................B60t 8/12
[58] Field of Search...............188/181 A; 303/20, 21; 324/162; 340/262

[56] References Cited

UNITED STATES PATENTS

| | | | |
|---|---|---|---|
| 3,554,612 | 1/1971 | Harned | 303/21 BE |
| 3,545,817 | 12/1970 | Yarber | 303/21 BE UX |
| 3,245,213 | 4/1966 | Thompson et al. | 303/21 EB |
| 3,511,542 | 5/1970 | Fielek, Jr. | 303/21 EB |
| 3,552,803 | 1/1971 | Lucien | 303/21 BE |
| 3,398,995 | 8/1968 | Martin | 303/21 BE |
| 3,401,984 | 9/1969 | Williams et al. | 303/21 BE |
| 3,522,973 | 8/1970 | Klein et al. | 303/21 R |
| 3,556,610 | 1/1971 | Leiber | 303/21 P |
| 3,604,761 | 9/1971 | Okamoto et al. | 303/21 CG |

*Primary Examiner*—Milton Buchler
*Assistant Examiner*—Stephen G. Kunin
*Attorney*—Jean L. Carpenter, Paul Fitzpatrick and Warren D. Hill

[57] ABSTRACT

A system for preventing the locking of vehicle wheels during braking includes an electronic control responsive to the velocity of the braked wheel for generating a signal which roughly simulates the vehicle deceleration and compares that signal with one representing wheel deceleration and derives an integrated control signal as a function of the difference between simulated vehicle and wheel velocities. The control signal operates a solenoid valve in a pneumatic circuit which controls a brake pressure modulator for releasing and applying the wheel brakes. A failure sensing circuit monitors critical points in the electronic control and the modulator to disable the control and light a warning lamp upon detecting a failure.

20 Claims, 6 Drawing Figures

Figure 2:
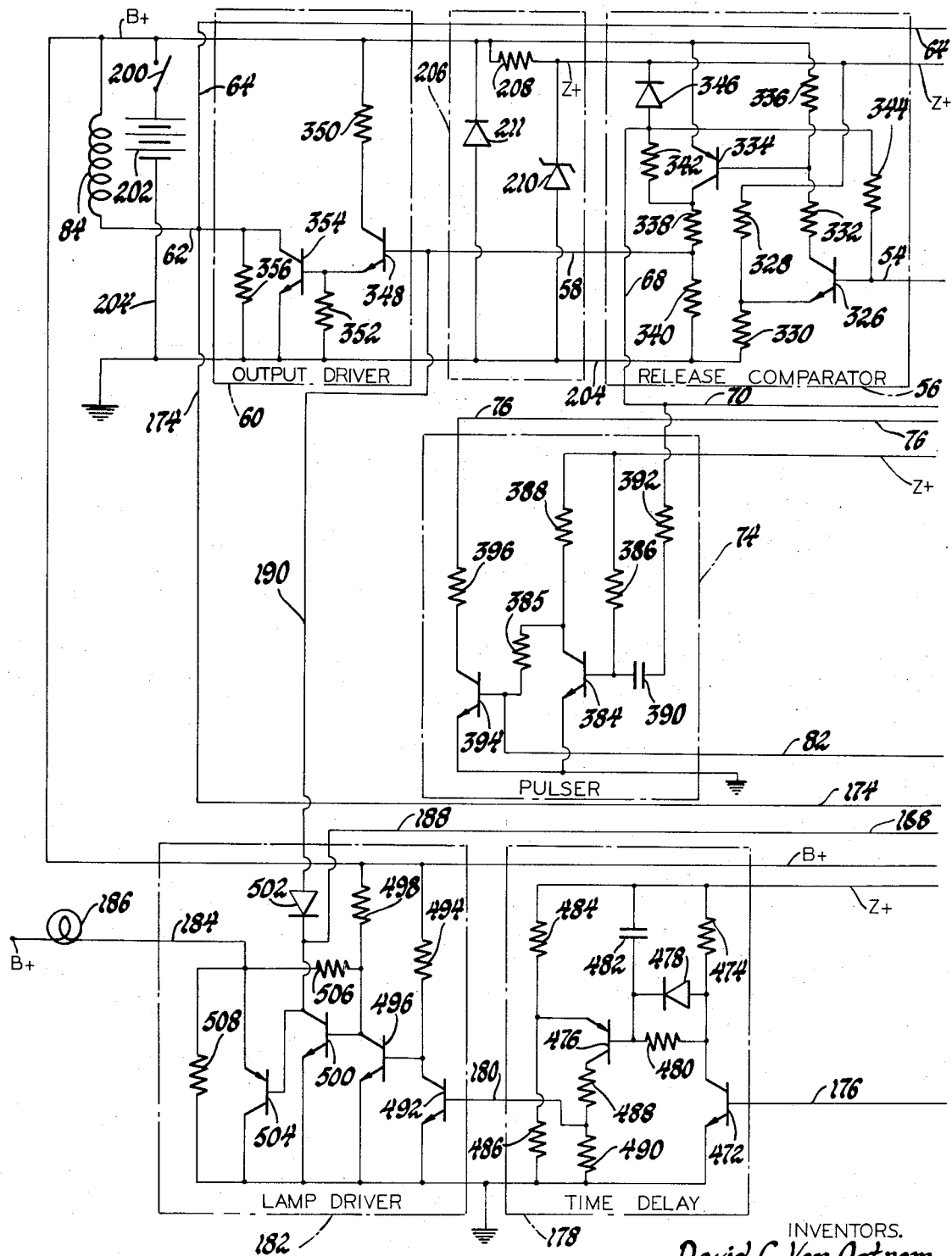

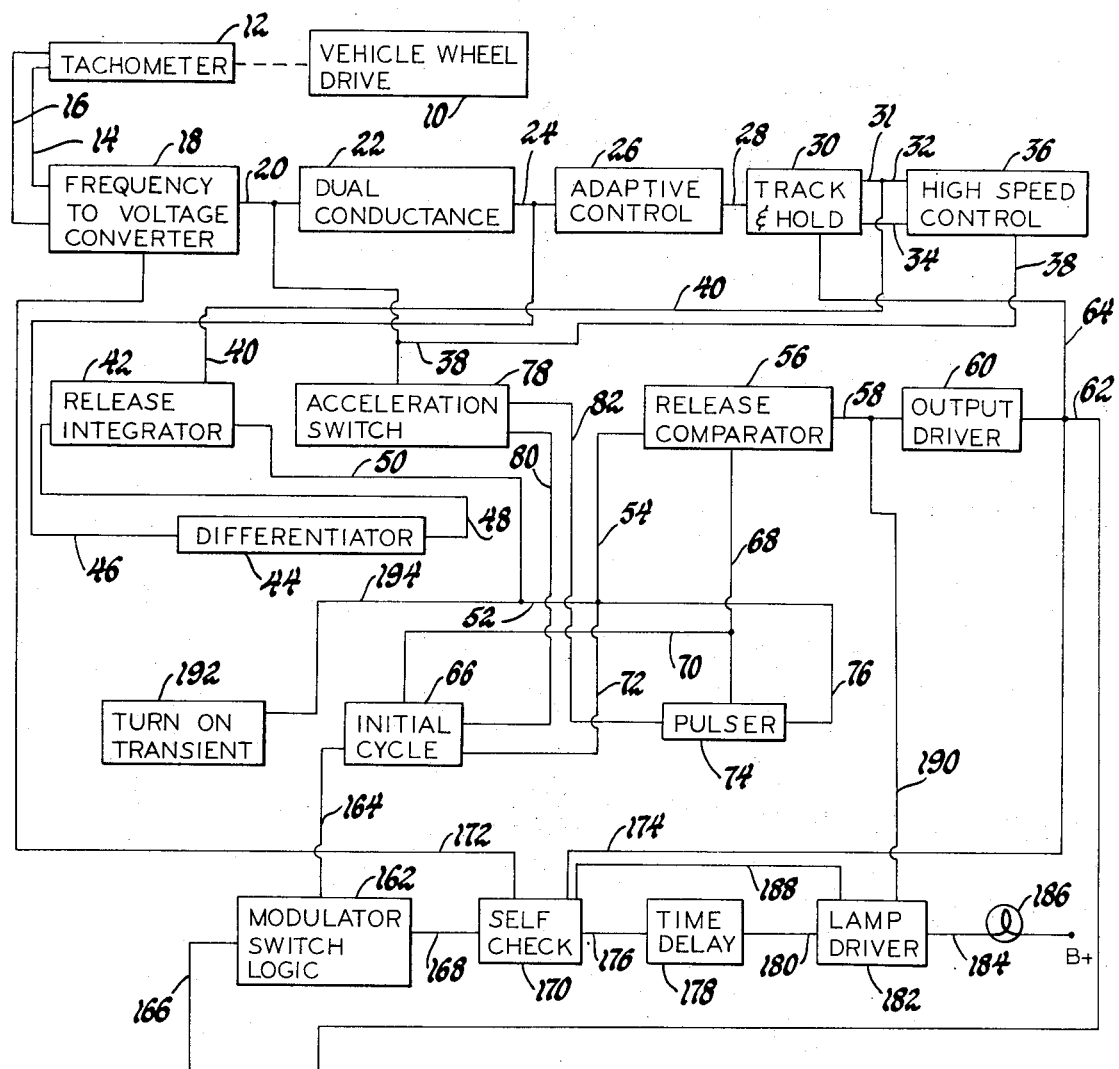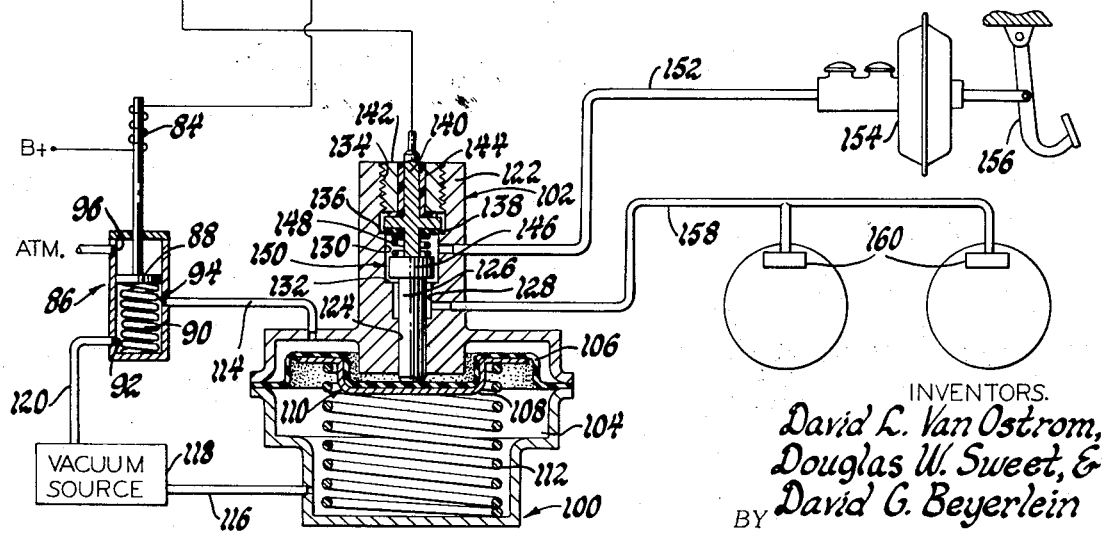
Fig. 2

INVENTORS.
David L. Van Ostrom,
Douglas W. Sweet, &
BY David G. Beyerlein

ATTORNEY

ADAPTIVE CONTROL ANTI-LOCK BRAKE SYSTEM

This is a Continuation of Ser. No. 806,807 filed Mar. 13, 1969, now abandoned.

This invention relates to an anti-lock control system for vehicle brakes and particularly to such a system which is adaptable to various road conditions.

It has previously been proposed in anti-lock brake controls to prevent or minimize wheel lock-up by sensing incipient lock-up and then releasing brake pressure until the wheel recovers in speed and then reapplying the brake pressure and repeating the cycle as often as necessary. To detect incipient wheel lock-up, it has been proposed to compare the deceleration of a braked wheel to a preprogrammed reference deceleration such as the deceleration of an inertia wheel or the like and to effect braking as a function of some fixed relationship between the actual and reference decelerations. Such a preprogrammed reference deceleration, however, does not accommodate all road conditions. If the coefficient of friction between the wheel and the road changes, it is desirable for best results to change the reference deceleration. Adaptive anti-lock brake controls have been proposed using an unbraked vehicle wheel to provide a vehicle deceleration reference. However, this is impractical for most vehicles.

It is therefore an object of this invention to provide a brake control system adaptive to varying road conditions and having a control circuit responsive only to signals from a braked wheel.

It is a further object of this invention to provide an adaptive brake control system including an electronic control circuit responsive to the velocity of a braked wheel for simulating vehicle deceleration.

It is another object of this invention to provide an adaptive anti-lock brake system having an electronic control for simulating vehicle deceleration during braking in response to the velocity of a braked wheel and sensing incipient wheel lock-up using a simulated deceleration as a reference.

It is still another object to provide in an adaptive brake control system having an electronic control, a circuit for disabling the control in the event of a system failure.

It is another object to provide in an electronic anti-lock brake control, a filter circuit which reduces AC ripple without degrading sensitivity of the control to wheel deceleration signals.

The invention is carried out by providing a tachometer and a circuit for generating a signal proportional to the velocity of a braked wheel, an adaptive control circuit responsive to the wheel velocity to derive a signal simulating vehicle deceleration during braking, a circuit for producing a signal which is a function of actual wheel deceleration, and a further circuit for comparing the signals and for producing a time integrated output signal which represents the amount that the simulated wheel velocity exceeds the actual wheel velocity and apparatus responsive to the output signal for controlling the release and application of brake pressure to the braked wheel.

The invention is further carried out by providing in an anti-lock brake system, an electronic incipient wheel lock-up sensing circuit having as an input a signal proportional to wheel acceleration and having a circuit responsive to the wheel velocity for providing a reference signal which is a simulation of vehicle deceleration and a circuit for summing and integrating the signals to produce an output which is a function of the difference between the wheel velocity and the simulated vehicle velocity, the output being adapted to control a brake pressure modulator. The invention further contemplates providing an acceleration switch responsive to wheel velocity for effecting brake pressure application at a predetermined value of wheel acceleration and a circuit for avoiding response of the system to spurious signals caused by wheel hop following brake application. A logic circuit monitors the system at several critical points and, in the event of a failure at any point, disables the output.

Figure 2A:
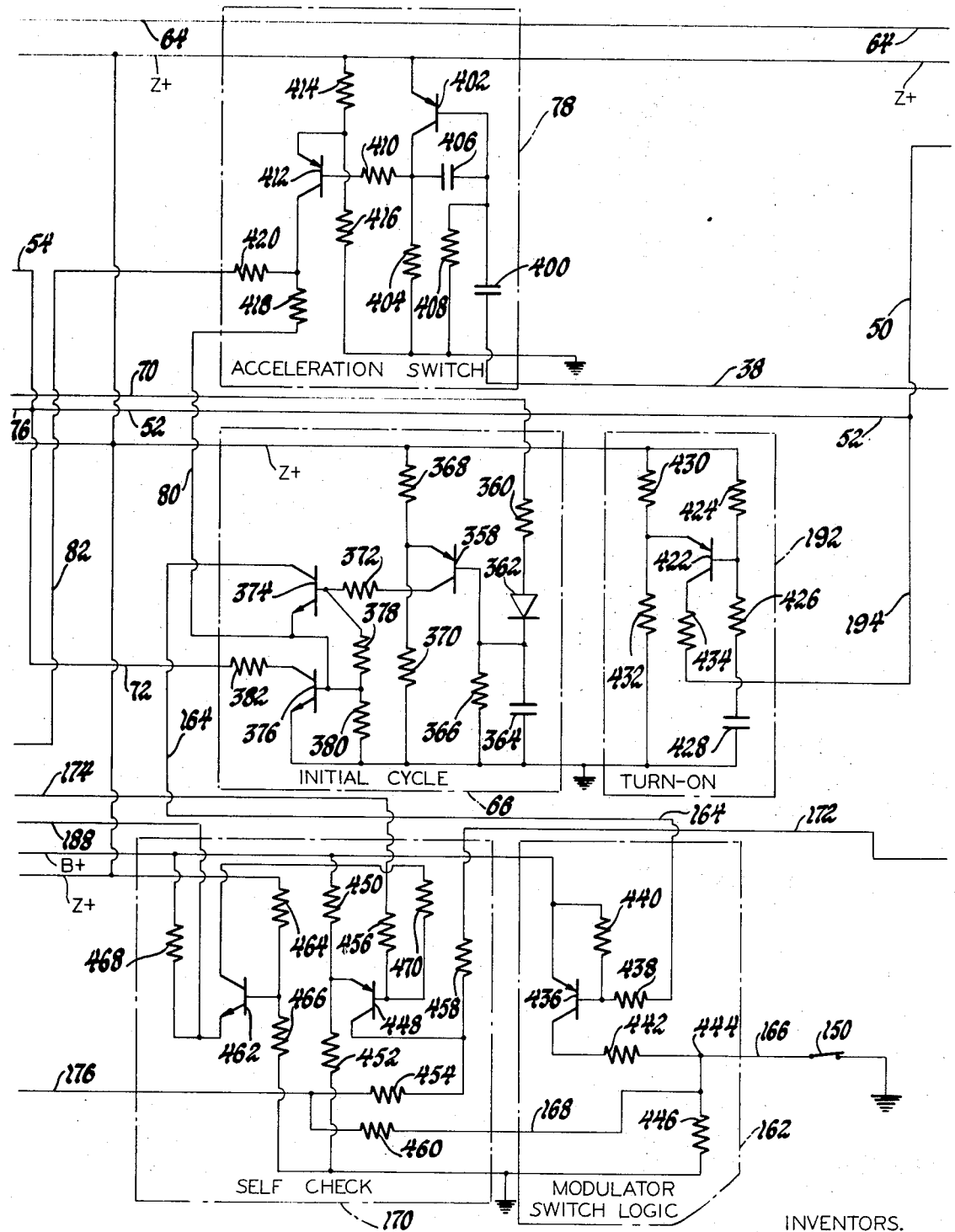
Figure 2B:
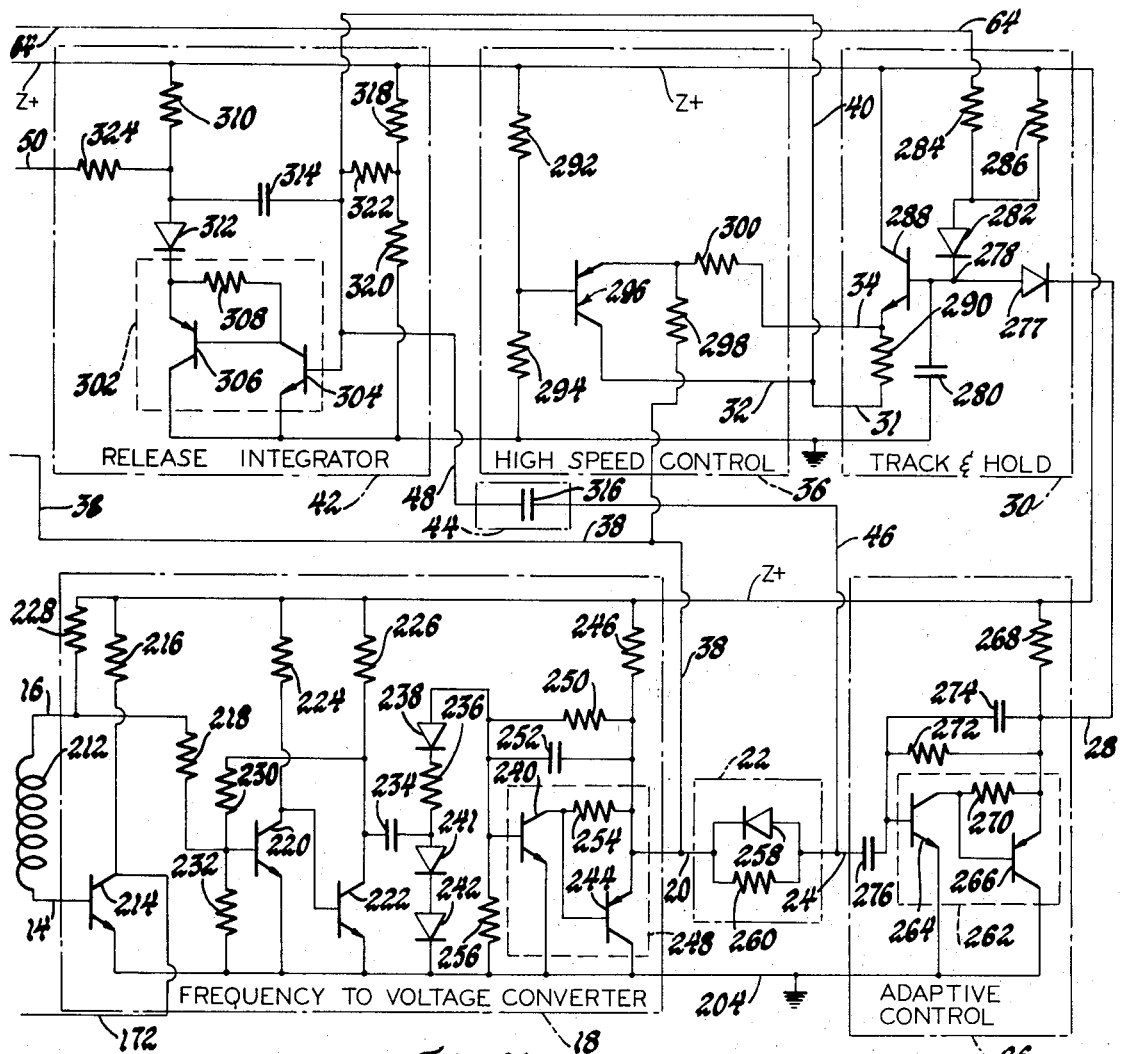
Figure 4:
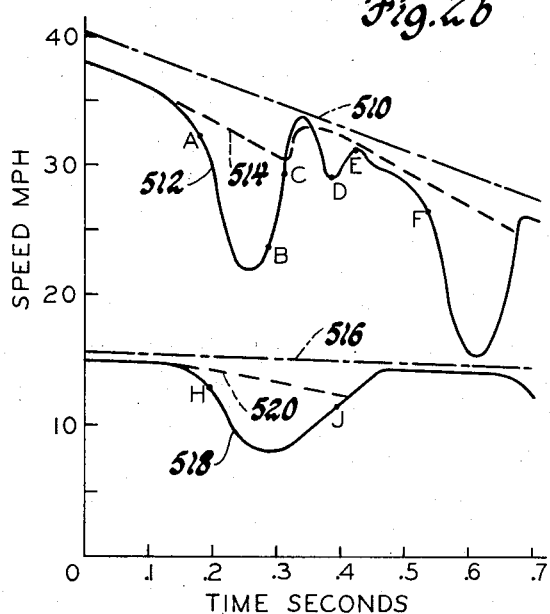
Figure 3:
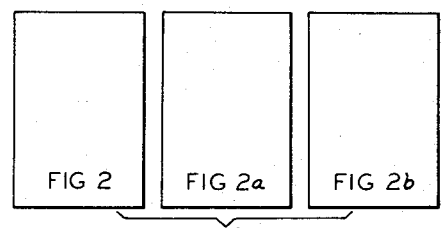

The above and other advantages will be made more apparent from the following specification taken in conjunction with the accompanying drawings wherein like reference numerals refer to like parts and wherein:

FIG. 1 is a diagrammatic representation of an anti-lock brake control system according to the invention;

FIGS. 2, 2a and 2b taken together are a schematic representation of the circuit of FIG. 1 according to the invention;

FIG. 3 indicates the layout of FIGS. 2, 2a and 2b for matching the several portions of the circuit; and, FIG. 4 is a graph depicting wheel velocity, vehicle velocity and simulated vehicle velocity during anti-lock brake control operation on two different road surfaces.

The system for which this invention is utilized follows the well established principle of sensing incipient wheel lock-up when brake pressure is applied to vehicle brakes then relieving the brake pressure until the wheel accelerates enough to be out of danger of locking and then reapplying the brake pressure. This cycle is repeated as necessary to achieve the desired braking action. The system further employs an improved version of the inertial wheel velocity reference principle which is fully set forth in the U.S. Pat. No. 3,554,612 to Harned issued Jan. 12, 1971. Stated precisely, the principle involves measuring the velocity of a braked wheel and subtracting therefrom a simulated vehicle velocity (or "optimum wheel velocity") and utilizing the difference as a criterion of when the wheel brake should be released and reapplied for most effective control. Heretofore, the "simulated" vehicle velocity has been determined by measuring the wheel deceleration at a time when the wheel speed is substantially synchronous with the vehicle speed and calculating vehicle velocity after brake application on the assumption that the vehicle decelerates at a predetermined fixed rate. It has been recognized that the rate of vehicle deceleration is not in reality a fixed value but that it depends on the coefficient of friction between the vehicle wheels and the road surface. This invention takes that variable into account by providing an adaptive control for simulating vehicle deceleration.

Referring to FIG. 1 for a further description of the system, the vehicle wheel drive 10 is provided as an information source for the system. The vehicle wheel drive 10 may be a wheel per se, a propeller shaft driving a plurality of wheels or any other vehicle member having a velocity or rotation proportional to wheel velocity. A tachometer 12 such as a well known toothed wheel variable reluctance electromagnetic transducer is driven by the wheel drive 10 and provides an alternating signal having a frequency proportional to the wheel speed on lines 14 and 16 leading to a frequency-to-voltage converter 18. The frequency-to-voltage converter 18 produces on line 20 a linear voltage proportional to frequency and hence proportional to wheel speed, but containing some AC ripple. The line 20 is connected to a dual conductance circuit 22 which provides some filtering of the AC ripple in the wheel speed signal but does not detract from the sensitivity of the following circuit to wheel deceleration. The dual conductance circuit 22 is connected by line 24 to an adaptive control circuit 26 which is responsive to the speed signal and produces an output on line 28 which roughly simulates vehicle deceleration by sensing wheel deceleration when the wheel speed is in substantial synchronism with the vehicle speed. The line 28 is connected to a track and hold circuit 30 which modifies the simulated vehicle deceleration signal on line 28. The track and hold circuit 30 is connected by lines 31, 32 and 34 to a high speed control circuit 36 which further modifies the simulated vehicle deceleration signal as a function of vehicle speed and the coefficient of friction between the vehicle wheels and the road. An input of the high speed control circuit 36 is connected by line 38 to line 20. The finally modulated simulated vehicle deceleration signal appears on line 40 and is connected thereby to a release integrator 42. A differentiator 44 is connected by line 46 to line 24 and by line 48 to the release integrator 42. The differentiator 44 senses a wheel speed signal on line 24 and differentiates that signal to produce an output on line 48 proportional to the wheel deceleration.

The release integrator 42 compares the wheel deceleration signal with the simulated vehicle deceleration signal and integrates the difference to produce on line 50 an output proportional to the difference between the simulated vehicle speed and the wheel speed. This velocity error signal is normally fed unaltered by lines 52 and 54 to a release comparator 56 which produces an output signal on line 58 whenever the velocity error signal exceeds a predetermined maximum. The release comparator includes a hysteresis circuit which terminates the signal on line 58 when the velocity error signal drops below a predetermined minimum value. The line 58 is connected to an output driver 60 which amplifies the signal on line 58 to produce an output on line 62. The line 64 connects the output signal on line 62 back to the track and hold circuit 30 to form an input thereto.

An initial cycle circuit 66 has an input from the release comparator 56 by way of lines 68 and 70 and has an output connected by line 72 and line 54 to the input of the release comparator 56. The function of the initial cycle circuit 66 is to provide a bias signal to the input of the release comparator 56 to render the release comparator less sensitive to the velocity error signal during the first cycle of anti-lock brake operation to insure that the wheel is approaching an incipient lock-up condition before effecting brake release. When the release comparator 56 produces a first release signal on line 58, it also provides a signal on lines 68 and 70 which terminates the output of the initial cycle circuit 66 and succeeding release signals on lines 68 and 70 will maintain the initial cycle circuit 66 off during subsequent cycles of anti-lock brake operation.

A 10-cycle per second wheel hop often follows brake application, particularly at high speeds on high coefficient roads. This wheel hop can produce spurious wheel speed signals interfering with proper operation of the brake control system. The circuit is rendered insensitive to such spurious signals for a short time following brake application by providing a bias signal on line 54 which overcomes the wheel hop signal. To this end there is provided a pulser 74, which is a one-shot multivibrator having as an input line 68 and an output line 76 connected to line 54. When the signal on line 68 is removed, thereby indicating brake application, a pulse of about 150 milliseconds duration is applied by line 76 to line 54.

Rather than rely on the release comparator 56 to determine in every instance the proper time for reapplication of brake pressure, an acceleration switch 78 is provided to cause brake application whenever wheel acceleration exceeds a predetermined value. The acceleration switch 78 is connected by line 38 to the line 20 and derives from the wheel speed signal a measure of wheel acceleration. When a predetermined acceleration has been reached, the acceleration switch 78 produces output signals on lines 80 and 82 leading to the initial cycle circuit 66 and the pulser 74, respectively. Those output signals cause the initial cycle circuit 66 and the pulser 74 to turn on thereby providing bias signals on lines 72 and 76 which cause the release comparator 56 to turn off thereby allowing brake application.

The output line 62 is connected to a solenoid 84 which operates a three-port valve 86 shown schematically as comprising a spool 88 biased by a spring 90 to a position allowing air flow only between ports 92 and 94 and movable by the solenoid 84 to a position allowing air flow only between ports 94 and 96. The valve 86 is a component of a brake pressure modulating system which comprises a combination pneumatic and hydraulic system. A brake pressure modulator 100 comprises a hydraulic portion 102 and a pneumatic chamber 104. The pneumatic chamber 104 is divided into two parts by a flexible diaphragm 106 having a rigid backing 108 which together comprise a power wall 110. The power wall 110 is biased upwardly by a coil spring 112 extending between the power wall 110 and the bottom of the pneumatic chamber 104. The part of the pneumatic chamber 104 above the power wall 110 is connected by a conduit 114 to the port 94 of the valve 86. The lower part of the pneumatic chamber 104 is connected by a conduit 116 to a vacuum source 118 which in turn is connected by a conduit 120 to the part 92 of the valve 86. The hydraulic portion 102 of the modulator 100 comprises a housing 122 with a central bore 124 carrying a piston 126. The bottom of the piston 126 contacts the power wall 110 and the upper portion of the piston 126 extends through an enlarged bore 128. The enlarged bore 128 communicates with a valve chamber 130 and the interface between the enlarged bore 128 and the valve chamber 130 defines a shoulder for a valve seat 132. An upper threaded cavity 134 forms a bore of greater diameter than the valve chamber 130 to define a shoulder 136. An insulating washer 138 seats against the shoulder 136 and a brass terminal 140 in the upper cavity seats against the insulating washer 138. A threaded nut 142 fitting within the cavity 134 secures the terminal 140 within the housing 122. An insulating sleeve 144 separates the nut 142 from the terminal 140. A check valve 146 within the valve chamber 130 is biased toward the valve seat 132 by a coil spring 148 extending between the insulating washer 138 and the check valve 146.

When the piston 126 is in its uppermost position, as shown, the valve 146 contacts the terminal 140 thereby providing a continuing electrical circuit from the brass terminal 140 to check valve 146 to piston 126 and the housing 122 to ground. When, however, the piston 126 is moved downwardly, the check valve 146 separates from the brass terminal 140 to open the electrical circuit. Therefore, the check valve 146 and the brass terminal 140 in combination comprise a modulator switch 150 which is useful as an indicator of whether the check valve 146 is open.

A port in the side of the valve chamber 130 is connected by a conduit 152 to a master cylinder 154 operated by a brake pedal 156 for supplying brake fluid under pressure to the valve chamber 130. A port in the enlarged bore 128 is connected to a conduit 158 leading to brakes 160 for supplying the brake fluid under pressure to the brakes 160.

Normally the valve 86 is in the position shown and vacuum pressure from the vacuum source 118 is applied to the conduits 114 and 116 to both sides of the pneumatic chamber 104 and in this condition the modulator 100 transfers the brake pressure from the master cylinder 154 to the brakes without any modulation. However, when the solenoid 84 is energized to actuate the valve 86, air flows through the port 96 and conduit 114 to the upper part of the pneumatic chamber 104 to force the power wall 110 down. The piston 126 follows the movement of the power wall 110 to allow the check valve 146 to close against the valve seat 132 to isolate the brakes 160 from the master cylinder 154 and further downward displacement of the piston 126 will relieve pressure from the brakes 160. If the solenoid 84 then is deenergized to allow the valve spool 88 to return to its normal position as shown the brakes 160 will tend to assume the master cylinder pressure. In operation of the system in general, when the electronic control circuit senses an incipient wheel lock condition, it causes the solenoid 84 to be energized to effect brake release to allow the wheel velocity to recover to achieve synchronism with vehicle velocity or nearly so. Then the electronic control circuit causes the brakes to be reapplied and if an incipient wheel lock condition occurs again, the cycle is repeated as often as necessary.

An electronic failure warning system includes a modulator switch logic circuit 162 having a mode signal input from the initial cycle circuit 66 on line 164 indicating the electronic control circuit is not operating in an anti-lock mode and a release signal input from the modulator switch 150 on line 166 indicating the pressure modulator has relieved brake pressure. The modulator switch logic circuit 162 comprises an AND gate which produces an output on line 168 whenever the initial cycle circuit 66 has a mode output and the modulator switch 150 is open. The signal line 168 comprises an input signal to a self-check logic circuit 170. A second input to the self-check circuit 170 is received on line 172 which is connected to the frequency-to-voltage converter 18. A signal is produced on line 172 whenever a short or an open circuit occurs in the tachometer or either of the lines 14 and 16. A third input to the self-check circuit 170 is a signal from the output line 62 received on line 174. The self-check circuit 170 thus comprises an OR gate which upon receiving an input signal from any source produces an output signal on line 176 which is connected to a time delay circuit 178. In the event that a signal on line 176 persists for a given time, say 2 seconds, the time delay circuit 178 produces an output on line 180 leading to a lamp driver circuit 182 which connects to ground a line 184 which leads to a warning lamp 186. The other side of the warning lamp 186 is connected to a power source B+. An output line 188 from the lamp driver circuit 182 extends to the self-check circuit 170 to provide a holding circuit to hold on the lamp 186 once it is illuminated. Another output line 190 from the lamp driver 182 is connected to the line 58 at the input of the output driver 60 to ground the line 58 and turn off the output driver 60 whenever the lamp 186 is illuminated. Thus the failure warning circuit not only provides failure indication but also disables the anti-lock brake control system whenever a failure signal from the modulator switch 150, from the frequency-to-voltage converter 18 or from the output line 62 persists for more than two seconds.

A normally operated vehicle may not require the use of the anti-lock brake control system for periods of several months. To avoid any danger of moving parts of the system becoming inoperative due to non-use, it may be desirable to occasionally exercise those parts. For this purpose, a turn-on transient circuit 192 is provided to produce an output on line 194 to lines 52 and 54 to provide a signal to the release comparator 56 when the vehicle ignition switch is closed, thus causing a brake release signal on output line 62 to briefly effect brake release and consequently exercising each moving part of the system.

Referring to FIGS. 2, 2a and 2b, showing the detailed schematic electrical circuitry, there is shown a B+ power supply line connected through a vehicle ignition switch 200 to one side of the vehicle battery 202. The other side of the battery is connected to a ground line 204. A power supply circuit 206 includes a voltage dropping resistor 208 connecting the B+ line with a regulated voltage supply line Z+. The voltage is regulated by a Zener diode 210 connected between lines Z+ and ground. The voltage regulation occurs by reason of the Zener diode 210 property of limiting the voltage dropping thereacross to a predetermined maximum. While the battery 202 has a nominal voltage of 12 volts the Zener diode 210 is selected to maintain the voltage at line Z+ at 8.2 volts. A diode 211 between the line B+ and ground protects the circuit against large negative voltage spikes.

With respect to the frequency-to-voltage converter 18, the input conductors 14 and 16 lead from the coil 212 of the tachometer 12. Line 14 leads to the base of a transistor 214 which has a grounded emitter and a collector connected to the line Z+ through a load resistor 216. With this arrangement, the transistor 214 is normally operating at saturation so that the line 172 is effectively clamped to ground potential. The input line 16 is connected through a resistor 218 to the base of a transistor 220 which in turn has its collector connected directly to the base of a transistor 222. Both transistors 220 and 222 have grounded emitters and have load resistors 224 and 226 respectively between their collectors and line Z+. A bias resistor 228 is connected between the line Z+ and the input conductor 16. The circuit thus far described then comprises a comparator which produces a square wave output at the collector of the transistor 222 of constant amplitude and having a frequency proportional to the tachometer 12 output frequency and therefore proportional to wheel velocity. A regenerative feedback circuit comprises a resistor 230 connected between the collector of transistor 222 and the base of transistor 220 and a voltage dividing resistor 232 between the base of transistor 220 and ground to provide hysteresis. The component values are selected to obtain ¼ volt hysteresis, and the voltage dividing resistor 232 is adjusted so that the switching point of the comparator is ± ⅛ volt across the tachometer coil 212. This hysteresis prevents low voltage noise generated by the tachometer 12 from affecting the comparator action and thus reduces spurious signals. The collector of the transistor 222 is connected to a capacitor 234 which in turn is connected to a transistor 236 and a diode 238 to the base of a transistor 240 and is further connected through a pair of diodes 241 and 242 to ground. The transistor 240 has a grounded emitter and its collector is connected to the base of a transistor 244 having a grounded collector and an emitter connected to line Z+ through a load resistor 246. The transistors 240 and 244 in combination, comprise a high gain amplifier or operational amplifier 248. A feedback resistor 250 and a capacitor 252 are each connected between the emitter of transistor 244 and the base of transistor 240. The value of the resistor 250 calibrates the scale factor of the frequency-to-voltage converter 18 while the capacitor 252 provides filtering. At high temperatures, the transistor 240 may leak enough to partially turn on the transistor 244. To avoid this, a large resistor 254 is connected between the base and the emitter of transistor 244 for allowing the leakage current to bypass transistor 244. A resistor 256 between the base of transistor 240 and ground provides biasing for the operational amplifier 248.

In the event it is desired to sense the speed of more than one wheel, each additional wheel is provided with a sensor like the tachometer 12 and a circuit like that just described including elements 214 through 241, such circuit being connected across the diodes 238 and 241. The frequency-to-voltage converter 18 will then have an output representing the average of the several wheel speeds.

In operation of the frequency-to-voltage converter 18 the square wave output of the transistor 222 effects charging of the capacitor 234, the charging current flowing through the diodes 241 and 242 to ground. The discharge current of the capacitor 234, however, flows from the operational amplifier 248 through the diode 238. With this arrangement, the input current of the operational amplifier 248 is proportional to the frequency of the square wave signal from the transistor 222 and the output voltage of the operational amplifier 248 on line 20 is therefore proportional to wheel speed.

The linearity of the frequency-to-voltage converter 18 depends on the values of the resistor 250 and the capacitor 252. By selecting these values so that the output on line 20 equals 60 millivolts/mph the output will be fairly linear up to 110 mph and the response flattens somewhat at higher speeds. The system however operates well at such high speeds. It may be desirable to make the converter non-linear in the normal speed range by increasing the value of the resistor 250 and decreasing the value of the capacitor 252 so that, for example, the output equals 90 millivolts/mph. Thus the output will be fairly linear up to about 75 mph and flattens considerably at higher speeds. An advantage of this non-linear embodiment is that the electronic control is less sensitive to decelerations occurring at speeds above 75 mph, so that the high speed control 36 is not necessary and may be omitted.

The signal on line 20 contains an AC ripple. To minimize the ripple, a dual conductance circuit 22 comprising a diode 258 and resistor 260 in parallel is connected at line 20. The output of the dual conductance circuit 22 on line 24 is connected to the adaptive control circuit 26 and the differentiator 44, which, as will be seen, have capacitive inputs feeding into constant voltage points. These capacitive inputs combined with the resistor 260 effect filtering of the AC ripple during positive going portions of the ripple. Negative going signals, however, pass through the diode 258 so that the circuits 26 and 44 are more sensitive to deceleration signals than to acceleration signals. The effect of the dual conductance circuit 22 then is to provide compromise filtering without degrading sensitivity to deceleration signals.

The adaptive control 26 includes an operational amplifier 262 having a transistor 264 with a grounded emitter and a collector connected to the base of a transistor 266. The latter transistor 266 has a grounded collector and an emitter connected to line Z+ through a load resistor 268. A leakage bypass resistor 270 is connected between the base and the emitter of transistor 266. A feedback resistor 272 and a capacitor 274 are each connected between the emitter of the transistor 266 and the base of transistor 264. A differentiating capacitor 276 couples the base of the transistor 264 to the line 24.

The purpose of the adaptive control 26 is to provide a useful measure of vehicle deceleration and to provide a corresponding output voltage. It is not intended that the measure of vehicle deceleration be exact but rather it is a useful approximation of vehicle deceleration. In a typical cycle of anti-lock operation after brake application the wheel deceleration is substantially synchronous with vehicle deceleration until a condition of incipient lock-up occurs. During that initial deceleration, the speed signal from the frequency-to-voltage converter 18 decreases and the differentiating capacitor 276 then provides at the operational amplifier 262 a measure of wheel deceleration. The output of the operational amplifier 262 at the emitter of the transistor 266 will then be nearly proportional to wheel deceleration and vehicle deceleration except that the output lags behind the input due to the time delay imposed by the RC constant of capacitor 274 and the resistor 272, and the output is limited to a range of deceleration from zero to a predetermined maximum preferably about 1.1 g. The type of limiting is important. When a positive acceleration signal is developed by the differentiating capacitor 276, the operational amplifier 262 is drive to saturation so that its output will be at zero volts and net acceleration is not measured. Moreover, the base-emitter current of the transistor 264 is then sufficient to clamp the base voltage of the transistor 264. Thus, the operational amplifier 262 is ready to react instantaneously to a deceleration signal when it occurs. During values of deceleration less than 0.8g, the output of the operational amplifier 262 will be proportional to deceleration. At about 0.8g of deceleration, however, the operational amplifier 262 is cut off, having reached maximum output. This maximum output represents about 1.1g of simulated vehicle deceleration. Additional deceleration will cause the base voltage of transistor 264 to decrease, providing a memory of the excess deceleration beyond a 0.8g reference. This excess must be recovered during subsequent acceleration before the output of the operational amplifier 262 can decrease. The 1.1g deceleration value limit may vary slightly but should be large enough to realistically represent the maximum vehicle deceleration which can occur during optimum braking conditions. It is necessary to place such a limit on the adaptive control output because a sustained high wheel deceleration such as can occur during braking when moving from dry pavement to ice would, in the absence of such a limit, give a high measure of apparent vehicle deceleration due to the low time delay provided by the capacitor 274 and the resistor 272. The value of the capacitor 274 is selected to be small enough to allow dynamic tracking of vehicle deceleration when the wheel is decelerating nearly in synchronism with the vehicle and yet large enough to remember vehicle deceleration when wheel deceleration increases rapidly. Exemplary component values are 1.0 megohms for resistor 272 and 0.047 mfd for the capacitor 274 when the capacitor 276 is 4.7 mfd and the frequency-to-voltage converter 18 output is 60 millivolts/mph. The adaptive control output on line 28 will provide a reasonably good measure of vehicle deceleration as long as the wheel and the vehicle are decelerating nearly synchronously and tends to maintain that some output for a short period after the wheel begins to decelerate rapidly. Eventually, however, due to the short memory of the adaptive control 26, the signal on line 28 will tend to increase to follow wheel deceleration.

The track and hold circuit 30 is provided to limit excursions of adaptive control output after a brake release signal is applied to line 62. The track and hold circuit 30 includes a diode 277 connected between line 28 and a junction point 278. The junction point is connected by a capacitor 280 to ground and is further connected through a diode 282 and a resistor 284 to the line 64. The diode 282 is also connected to the line Z+ through a resistor 286. A transistor 288 has its base connected to the junction point 278, its collector connected to line Z+ and its emitter connected to line 34. The emitter is also connected through a resistor 290 to line 31. In operation, during brake application, the line 62 and hence the line 64 is at B+ potential so that current flows through the diode 282 and 277 to line 28. Then, except for the small voltage drop across the diode 277, the voltage at the junction point 278 and on the capacitor 280 are equal to the voltage on line 28 as determined by the adaptive control 26. Thus so long as the brakes are applied, the voltage of the junction 278 will track the voltage of line 28. The emitter of the transistor 288 will essentially follow the voltage of the base, the transistor serving only to isolate the capacitor 280 from the output lines 31 and 34 so that the capacitor 280 can hold its charge. When the output on line 62 approaches ground potential to call for brake release, the line 64 will also be at ground potential and the junction of the resistors 284 and 286 will assume a potential less than Z+ by virtue of the voltage dividing action of the resistors 284 and 286. Preferably, those resistors are selected to provide a voltage of about 4 volts which corresponds to a deceleration of 0.5g's. This arrangement then allows the voltage at the junction point 278 to track down according to the voltage at line 28, but will not allow the voltage to track up beyond 4 volts due to the back biasing of the diode 282. If, however, at the time of brake release, the voltage at the junction point 278 is higher than 4 volts, then that voltage will be held after brake release by reason of the capacitor 280, provided, of course, that the voltage on line 28 does not decrease. Thus the output voltage on line 34 will be essentially the same as the voltage on the line 28 except for the limitations imposed by the track and hold circuit 30 after brake release.

During normal anti-lock cycling, wheel deceleration is greater than vehicle deceleration in the "synchronous" portion of the cycle, the difference between the two being very small at low speeds on icy roads and becoming greater as either the speed or the coefficient of friction increases. Thus at high speeds on dry roads, the difference between wheel and vehicle deceleration may be large enough to affect the stability of the control system. It is desirable then to make the control less sensitive at high speeds when a linear frequency-to-voltage converter 18 is employed. This is accomplished by the high speed control 36 which includes a voltage divider comprising resistors 292 and 294 between the Z+ line and ground. A transistor 296 has its base connected at the junction of the transistors 292 and 294 and has its collector connected by line 32 to the line 40. The emitter of the transistor 296 is connected through a resistor 298 to the line 38, which carries the wheel speed signal, and is also connected through a resistor 300 to line 34. Since line 34 is an output of the track and hold circuit, the voltage thereof is a function of the coefficient of friction. Thus, when the coefficient of friction and the wheel speed becomes large, the emitter voltage of the transistor 296 becomes larger than the fixed base voltage and the transistor 296 conducts to provide a current by line 32 to line 40. The current on line 32 will preferably vary up to a value representing 2g's deceleration, the amount of the current depending upon the coefficient of friction and the wheel speed.

The release integrator 42 comprises an operational amplifier 302 similar to those previously described incorporating transistors 304 and 306 and a leakage bypass resistor 308 between the base and the emitter of transistor 306. A load resistor 310 and a temperature compensating diode 312 are connected between the emitter of the transistor 306 and the line Z+. A capacitor 314 across the operational amplifier 302 performs an integrating function. The input to the release integrator 42 is the differentiator 44 which comprises a capacitor 316 connected to the line 46. A voltage divider comprising resistors 318 and 320 between the line Z+ and ground and a bias resistor 322 connected from the junction of the resistors 318 and 320 to the line 40 provide a constant bias current representing 0.1g to the base of the transistor 304. The current from line 40 provides variable bias to the base of the transistor 304. An output resistor 324 is connected to the junction of the diode 312 and resistor 310 to provide an output to line 50. The release integrator 42 is responsive to the difference between the wheel deceleration as determined by the current through the capacitor 316 and the bias currents on line 40. The output of the operational amplifier 302 on line 50 is the integral of the difference between the simulated vehicle deceleration computed by the adaptive control 26 and the track and hold circuit 30 as modified by the high speed control 36 and the wheel deceleration, which output is termed a velocity error. Although the circuit does not produce a signal representing a simulated vehicle velocity, per se, it does compare a function of simulated vehicle velocity to a function of wheel velocity and operate on the difference to achieve a velocity error signal.

The release comparator 56 switches on at a preset velocity error and switches off at a lower value of the velocity error. The release comparator 56 includes a transistor 326 having its base connected to the input line 54 and its emitter connected to the midpoint of a voltage divider comprising resistors 328 and 330 between Z+ and ground: the emitter voltage thus establishing the switching point of the transistor 326. The collector of the transistor 326 is connected by a resistor 332 to the base of a transistor 334 which in turn is connected to the line B+ through a resistor 336. The emitter of the transistor 334 is connected to the line B+ and the collector is connected to ground through load resistor 338 and leakage bypass resistor 340, the junction of which is connected to output line 58. A regenerative feedback circuit comprising resistors 342 and 344 connects the collector of the transistor 334 to the base of the transistor 326. The junction of the resistors 342 and 344 is connected by a diode 346 to line Z+ to provide voltage regulation of the feedback circuit thus assuring that the feedback current is independent of B+ potential. In operation when the voltage on line 54 exceeds the reference voltage, preferably corresponding to a velocity error of 2 mph, on the emitter of the transistor 326, that transistor turns on to turn on the transistor 334 and provide a high current signal on the output line 58. The feedback circuit (resistors 342,344) assures fast switching of the transistors 326 and 334 and also provides hysteresis so that the turn-off voltage of the transistor 326 will be lower than the turn on voltage, preferably corresponding to a velocity error of 1 mph.

The output driver 60 has a transistor 348 with its base connected to the line 58, its collector connected through a load resistor 350 to B+ and its emitter connected to ground through a bias resistor 352. The emitter of the transistor 348 is also connected to the base of a transistor 354 having a grounded emitter and its collector connected to the output line 62. When a high current is conducted by the line 58, both transistors 348 and 354 switch on to connect line 62 to ground to energize the solenoid 84. A resistor 356 having a large value relative to the resistance of the solenoid 84 is connected across the emitter and the collector of the transistor 354. This assures that the line 62 will be at a low potential in the event of an open circuit in a lead of the solenoid 84 even though the transistor 354 is turned off.

The initial cycle amplifier 66 has as its purpose to apply an additional bias to the base of the transistor 326 of the release comparator 56 to increase the threshold at the release comparator 56 input. This additional bias is to be applied only at the beginning of the first cycle of anti-lock brake operation and is to be removed as soon as the first brake release signal energizes the output conductor 58. The effect of this temporary increase of the threshold is to insure that an incipient lock-up condition is present before the anti-lock control system is operative to release brake pressure.

Preferably, the threshold is increased to a velocity error of about four miles per hour as compared to the usual threshold of 2 miles per hour used for cycles subsequent to the first cycle. The initial cycle amplifier 66 includes a transistor 358 having its base connected through a resistor 360, a diode 362 and lines 70 and 68 to the junction of the resistors 342 and 344 in the release comparator 56. The base of the transistor 358 is connected to ground through a time delay circuit comprising a capacitor 364 in parallel with a resistor 366. Voltage dividing resistors 368 and 370 are connected between the line Z+ and ground and have a junction point connected to the emitter of the transistor 358. The collector of the transistor 358 is connected through a limiting resistor 372 to the base of a transistor 374. Transistor 374 has its collector connected to the line 164 and its emitter connected to the base of a transistor 376 and to the line 80. Leakage bypass resistors 378 and 380 are connected between the base of the transistor 374 and ground and their junction is connected to the base of the transistor 376. The transistor 376 has a grounded emitter and its collector is connected through a load resistor 382 to the line 72. The transistor 376 serves as an OR gate which is turned on when the line 80 is energized or the transistor 358 is turned on. The transistor 374 when energized serves to connect the line 164 to ground through the emitter-base junction of transistor 276.

In operation of the initial cycle amplifier 66, before the anti-lock system is energized, the voltage of the line 70 will be essentially at ground potential so that the transistor 358 will be conducting to cause the transistors 374 and 376 to conduct thereby effectively connecting the output resistor 324 in the release integrator 42 and the resistor 382 in series between the diode 312 and ground to provide a voltage divider to diminish the signal on the line 54 and the base of the transistor 326. This, in effect, imposes a bias signal on the base of the transistor 326. When, however, the release comparator and the line 70 are energized, the transistors 358, 374 and 376 will be turned off thereby removing the bias signal from the transistor 326. The component values of the time delay circuit comprising the capacitor 364 and the resistor 366 are selected to hold the transistor 358 off for about one second after the line 70 is deenergized. This time delay period represents the maximum period of each anti-lock apply cycle so that due to the periodic energization of the line 70 during each anti-lock period, the transistor 358 will be held off throughout the duration of anti-lock brake operation with the obvious exception of the first cycle.

The pulser 74 is intended to provide a large threshold or bias to the release comparator 56 when wheel hop first occurs to render the release comparator insensitive to spurious wheel hop signals. Wheel hop is a function of the dynamic suspension characteristics of a vehicle and typically results in a 10 cycle per second oscillation or ringing of the wheel upon brake application on a dry road. The ringing is reflected in the velocity signal and is particularly pronounced on the first cycle. The pulser 74 includes a transistor 384 having a grounded emitter and having its base and collector connected to the line Z+ through resistors 386 and 388 respectively. The base is further connected through a capacitor 390 and a resistor 392 to the line 68. The collector of the transistor 384 is connected through a resistor 385 to the base of a transistor 394 which has a grounded emitter and its collector connected through a load resistor 396 and lines 76 and 54 to the base of the transistor 326. During brake release the line 68 is energized, the transistor 384 is on and the transistor 394 is off. When the release comparator 56 is deenergized to effect brake application, line 68 drops to ground potential and the capacitor 390 discharges to momentarily reduce the voltage on the base of the transistor 384 to turn off the transistor 384 and turn on the transistor 394 to momentarily connect the resistor 396 to ground and diminish the signal on the line 54 by reason of the voltage dividing action of the resistors 324 and 396. The components are selected to produce a pulse of about 150 milliseconds duration. This is adequate to render the release comparator 56 insensitive to wheel hop signals.

The release comparator 56, responsive to velocity error signals, not only effects brake release but also will effect brake reapplication when the velocity error has been reduced. In some instances, as on dry roads, the wheel velocity recovers rapidly after brake release and it has been found to be desirable to reapply the brakes when the wheel reaches a predetermined acceleration instead of waiting for the velocity error to be reduced. This results in more efficient operation of the system. The acceleration switch 78 is provided to carry out this function.

The acceleration switch 78 includes a differentiating capacitor 400 connected to the line 38 and to the base of a transistor 402. The emitter of the transistor 402 is connected to the line Z+ and the collector is connected to ground through a load resistor 404. A capacitor 406 is connected across the base and collector and with the resistor 404 acts as a filter of AC ripple. A resistor 408 connected between the base of transistor 402 and ground acting with the capacitor 400 establishes the acceleration required for switching the transistor 402. The collector of the transistor 402 is connected through a resistor 410 to the base of a transistor 412. The emitter of the transistor 412 is connected to the junction of voltage dividing resistors 414 and 416 which extend between the line Z+ and ground. The collector of the transistor 412 is connected through the resistors 418 and 420 to the lines 80 and 82. Line 80 is connected to the base of the transistor 376 of the initial cycle circuit 66 and the line 82 is connected to the base of the transistor 394 in the pulser 74. Normally the transistor 402 is conducting to hold the transistor 412 off. When the wheel acceleration exceeds a predetermined value, preferably 3g's, the transistor 402 cuts off to turn on the transistor 412 thereby energizing the lines 80 and 82. Then the outputs of the initial cycle circuit 66 and the pulser 74 are turned on to bias the release comparator 56 to cut-off thereby effecting brake application. The acceleration switch 78 will be turned off and the bias removed from the release comparator when the wheel acceleration drops below the predetermined reference acceleration sufficiently to remove from memory the effects of previous excessive acceleration.

The turn on transient circuit 192 comprises a transistor 422 having its base connected to the line Z+ through a resistor 424 and connected to ground through a resistor 426 and a capacitor 428 in series. The emitter of the transistor 422 is connected at the junction point of voltage dividing resistors 430 and 432 which extend from the line Z+ to ground. The collector of the transistor 422 is connected through an output resistor 434 to the line 194. When the ignition switch 200 is first closed to energize the line Z+, the capacitor 428 will be uncharged and the base of the transistor 422 will be at a lower voltage than the emitter, thereby causing the transistor 422 to turn on and apply a current to the line 194. The component values are so selected that after about 100 milliseconds, the capacitor 428 will become sufficiently charged to cause the transistor 422 to turn off and remain off so long as the ignition switch 200 remains closed. The resulting pulse on line 194 is transmitted by lines 52 and 54 to the release comparator 56 causing the release comparator to turn on and release the brakes for 100 milliseconds. Thus the working parts of the anti-lock brake system are briefly exercised when the ignition switch is closed.

The remainder of the circuitry of FIGS. 2, 2a and 2b comprises a warning and failsafe system which monitors several areas of the anti-lock brake system. The modulator switch logic circuit 162 has a transistor 436 having its base connected through a resistor 438 to the line 164 and also connected through a large resistor 440 to the line B+. The emitter of the transistor 436 is connected directly to the line B+ while the collector is connected through a load resistor 442 to a junction point 444. The junction point 444 is connected by line 166 to the modulator switch 150, to ground through a resistor 446 and to an output line 168. Normally, when the anti-lock brake system is not in operation, the initial cycle circuit 66 will be energized so that the transistor 374 is conducting and a voltage lower than B+ is applied to the line 164 and current is drawn through the base of the transistor 436 to turn on the transistor 436. So long as the modulator switch 150 is closed, the junction point 444 is grounded and the operation of the transistor 436 will not produce an output on line 168. If, however, the modulator switch 150 opens, thereby indicating that the modulator has moved to release position, the junction point 444 will no longer be grounded and an output will be applied on line 168. During anti-lock brake operation, the line 164 is deenergized when the brakes are first released and the transistor 436 will be turned off by reason of high voltage applied to the base through the resistor 440 so that opening of the modulator switch 150 will be ineffective to produce an output on line 168. In essence, the modulator switch circuit 162 then is an AND gate which produces an output when the initial cycle circuit 66 is energized and the modulator switch 150 is opened, thereby indicating an undesirable condition.

The self-check circuit 170 includes a transistor 448 having its emitter connected to the junction of voltage dividing resistors 450 and 452 which extend from the line B+ to ground. The collector of the transistor 448 is connected through a load resistor 454 to the output line 176. The base of the transistor 448 is connected through a resistor 456 to the line 176 which in turn is connected to the line 62. As explained previously, the voltage on line 62 and 174 is always at nearly B+ potential unless the transistor 354 is conducting or either of the leads to the solenoid 84 are open or shorted to ground. In the event a ground signal appears on line 174, the transistor 448 will conduct to produce an output on line 176. The line 176 is also connected through the resistor 454 and a resistor 458 to the line 172 which extends to the collector of the transistor 214 in the frequency-to-voltage converter 18. Normally, the transistor 214 is biased into saturation so that the line 172 assumes a ground potential. If, however, either of the leads 14 or 16 to the tachometer coil 212 become open or shorted to ground, the transistor 214 will cease to conduct and high voltage will be applied to the line 172 and hence to the line 176. The line 176 is further connected by a resistor 460 to the line 168 so that it will also carry information regarding the condition of the pressure modulator. A latching circuit in the self-check circuit includes a transistor 462 having its base connected at the junction of voltage dividing resistors 464 and 466 which extend between the line Z+ and ground. The emitter of the transistor 462 is connected directly to line 188 and is connected by a large resistor 468 to the line B+. The collector of the transistor 462 is connected through a resistor 470 to the base of the transistor 448. Normally the B+ voltage applied through the resistor 468 to the emitter of the transistor 462 maintains that transistor off. If, however, the lamp driver 182 is energized, the line 188 becomes grounded thereby permitting the transistor 462 to conduct which in turn causes the transistor 448 to conduct continuously, thereby sustaining an output on line 176 so long as the voltage remains on the line B+.

The time delay circuit 178 includes a transistor 472, having its base connected to line 176, its emitter connected to ground and its collector connected through a load resistor 474 to the line Z+. The collector is further connected to the base of a transistor 476 through a diode 478 and a resistor 480 in parallel. The base of the transistor 476 is connected to the line Z+ through a time delay capacitor 482. Voltage dividing resistors 484 and 486 are connected between the line Z+ and ground and have a junction point connected to the emitter of the transistor 476. With this arrangement, when the line 176 carries a current, the transistor 472 turns on and the transistor 476 will turn on only after a time delay effected by the charging of the capacitor 482 through the resistor 480. Preferably, the circuit values are so selected that the time delay will be of the order of 2 seconds. When the transistor 472 turns off the capacitor 482 will rapidly discharge through the diode 478. The transistor 476 will then be insensitive to the transistor 472 switching on except when the latter remains on for a long time. The collector of the transistor 476 is connected through current limiting resistor 488 and leakage bypass resistor 490 to ground, the output line 180 being connected to the junction point of the resistors 488 and 490.

The lamp driver 182 includes a transistor 492 having its base connected to line 180, its emitter connected to ground and its collector connected to line B+ through a load resistor 494. The collector of the transistor 492 is also connected to the base of a transistor 496 having a grounded emitter and a collector connected to line B+ through a load resistor 498. A transistor 500 has its base connected to the collector of the transistor 496, its emitter connected to ground and its collector connected through a diode 502 to the line 190. A transistor 504 has a grounded collector, a base connected to the collector of the transistor 500 and its emitter connected by line 184 to one side of the lamp 186. The other side of the lamp 186 is connected to line B+. A feedback resistor 506 connects the emitter of the transistor 504 to the base of the transistor 500. A bleed resistor 508 connects the line 184 to ground and conducts enough current when the transistor 504 is off to keep the lamp 186 warm but not illuminated, thereby avoiding current surges which occur when power is applied to a cold lamp filament.

When a current is supplied through line 180, transistor 492 conducts to turn off the transistor 496 and turn on the transistors 500 and 504. When the transistor 504 conducts, the lamp 186 is illuminated. When the transistor 500 conducts, the line 188 is grounded to turn on the transistor 462 and hold on the self-check circuit 170 and the lamp driver 182. In addition, when the transistor 500 conducts, the line 190 is connected to ground thereby grounding the base of the transistor 348 in the output driver 60 to therefore deenergize the solenoid 84 and permit brake application. The B+ line connected to the lamp 186 is separate from the main B+ power supply line to the control circuit so that if for some reason the power is lost on the line B+ power may still be applied to the lamp 186 as well as to the base of the transistor 500 via the line 184 and the feedback resistor 506, thereby turning on the transistors 500 and 504 to cause illumination of the lamp 186.

In summary of the function of the failure warning circuitry, the lamp 186 will be illuminated and the solenoid 84 will be deenergized if any of the following conditions persist for more than 2 seconds: (1) the initial cycle circuit 66 is conducting and the modulator switch 150 is open; (2) either of the leads to the solenoid 84 is open or shorted to ground; (3) the transistor 354 of the output driver is turned on or (4) either of the leads 14 and 16 to the tachometer coil 212 are open or shorted to ground. Once the lamp 186 is turned on it is held on until the ignition switch 200 is opened to remove the main B+ supply. If, at any time, the main B+ supply to the control circuit fails while B+ is applied to the lamp 186, the lamp will be illuminated.

In summarizing the operation of the control circuit, reference is made to FIG. 4 which graphically shows the operation of the anti-lock brake control. The upper set of curves depicts typical anti-lock brake control cycles for operation on dry pavement. The broken line 510 shows vehicle speed, the solid line 512 shows wheel speed while the dashed line 514 depicts simulated vehicle speed. After brake application on dry pavement, the wheel speed 512 is somewhat less than vehicle speed 510 due to the normally occurring wheel slip. The wheel deceleration as shown by the slope of the curve 512 is initially slightly greater than the vehicle deceleration of 0.83g shown by the slope of the line 510. The adaptive control circuit senses the initial wheel deceleration and due to a slight gain in the adaptive control circuit produces an output on line 28 which represents a deceleration of 1.1g which is the maximum possible output of the adaptive control 26. That signal on line 28 is fed by the track and hold circuit via line 40 to the release integrator 42. An additional 0.1g is added to the signal by the biasing resistor 322 to provide a net simulated vehicle deceleration signal of 1.2g which is reflected in the slope of the curve 514. At such low speeds the high speed control circuit 36 is ineffective to modify the simulated deceleration signal. The differentiator 44 provides a signal proportional to wheel deceleration and the release integrator 42 compares the wheel deceleration to the simulated wheel deceleration and integrates the difference to determine the velocity error. The Velocity error is represented by the vertical distance between curves 512 and 514 at a given time. When, at point A, the velocity error reaches 2 miles per hour, the release integrator 56 turns on to switch on the output driver 60 and energizes the solenoid 84 to effect brake release. Thereafter, the system gradually responds to the brake release until the wheel rapidly accelerates. At point B when the wheel acceleration slightly exceeds 3g, the acceleration switch 78 turns on to force the release comparator 56 to turn off and to deenergize the solenoid 84 and effect brake application. If it were not for the use of the acceleration switch 78, the brakes would not be reapplied until point C when the velocity error decreased to 1 mile per hour. Thus, the acceleration switch results in a shorter release time and increases braking effectiveness. The wheel hop which occurs following brake application on dry pavement is reflected in the curve 512 by the loop between points C and E. The wheel hop signal produces at point D a velocity error 3½ miles per hour which would be adequate to cause the release comparator 56 to effect brake release were it not for the use of the pulser 74 which increases the threshold of the release comparator 56 to 6 miles per hour for a period of 150 milliseconds after application at point B. After the pulser 74 drops out at point E, the control is prepared to signal the next release signal at point F on a 2 miles per hour velocity error basis.

Referring now to the use of the anti-lock brake control on a low coefficient surface, the lower set of curves in FIG. 4 illustrates a typical anti-lock brake control cycle for operation on glare ice, wherein the broken line 516 depicts vehicle speed, the solid line 518 represents wheel speed and the dashed line 520 represents the simulated vehicle speed. The wheel speed 518 during braking is initially very close to vehicle speed 516 and the wheel and vehicle decelerations are nearly synchronous. The adaptive control circuit 26 tracks the vehicle deceleration until point H where the velocity error reaches 2 miles per hour and the brakes are released. The output of the adaptive control then tends to increase as the wheel deceleration increases. However, after brake release at point H, the track and hold circuit 30 keeps the simulated deceleration on line 40 from exceeding 0.4g's which when added to the constant bias supplied in the release integrator 42 amounts to a total simulated vehicle deceleration 520 of 0.5g's as shown by the final slope of the curve 520. As the wheel speed recovers after brake release at point H, the velocity error decreases to 1 mile per hour at point J to turn off the release comparator 56 and effect brake application, whereafter wheel speed 518 fully recovers. The acceleration switch 78 is not actuated since the wheel acceleration reaches a maximum of only 1.9g and the acceleration switch 78 is not triggered. Thus, the combined use of the adaptive control circuit 26 and the track and hold circuit 30 achieves a very good correlation between simulated vehicle deceleration 520 and vehicle deceleration 516 and yet allows the simulated speed 520 to drop after brake release to allow early brake reapplication at point J to achieve brake application and yet allow the wheel speed 518 to fully recover.

In the foregoing description and the appended claims, the term "acceleration," unless otherwise qualified, means the rate of change of speed with time, whether increasing or decreasing.

The embodiment of the invention described herein is for purposes of illustration and the scope of the invention is intended to be limited only by the following claims.

It is claimed:

1. In an anti-lock brake control system for a wheeled vehicle, means for sensing incipient lock-up of a braked wheel comprising
   means for producing a first signal which is a function of wheel acceleration,
   means responsive to wheel acceleration for producing a second signal which approximately simulates vehicle deceleration and,
   means for time integrating the difference between the first and second signals to provide an output signal proportional to the difference between simulated vehicle velocity and wheel velocity, the output signal thereby providing a means of sensing incipient wheel lock-up.

2. In an anti-lock brake control system for a wheeled vehicle having wheel braking means, means for sensing incipient lock-up of a braked wheel comprising
   means responsive to wheel rotation for producing a speed signal as a function of wheel speed,
   differentiating means responsive to the speed signal for producing at least two acceleration signals as a function of the rate of change of the speed signal,
   time delay means responsive to one of the acceleration signals for producing a signal which approximately simulates vehicle deceleration,
   and time integrating means responsive to the difference between another of the acceleration signals and the vehicle deceleration signal to provide an output signal proportional to the difference between simulated vehicle velocity and wheel velocity, the output signal thereby providing a means of sensing incipient wheel lock-up.

3. In an anti-lock brake control system for a wheeled vehicle having wheel braking means, means for sensing incipient lock-up of a braked wheel comprising
means responsive to wheel rotation for producing a speed signal as a function of wheel speed,
differentiating means responsive to the speed signal for producing a deceleration signal as a function of wheel deceleration,
means for producing a variable bias signal as an approximate function of vehicle deceleration,
time integrator means responsive to the variable bias signal and the deceleration signal to provide a velocity error signal proportional to the difference between the approximate vehicle velocity and the wheel velocity, thereby providing a measure of incipient wheel lock-up
and comparator means responsive to the value of the velocity error signal for alternately releasing and applying the wheel braking means as the velocity error signal varies to thereby cause the wheel to cyclically accelerate and decelerate, the wheel deceleration normally being in substantial synchronism with vehicle deceleration during a portion of the time when braking means is applied,
the means for producing a variable bias signal including means responsive to wheel deceleration for sampling wheel deceleration during the time the wheel deceleration is in substantial synchronism with the vehicle deceleration for generating the bias signal as a function of the vehicle deceleration and for maintaining the bias signal after the synchronism period.

4. In an anti-lock brake control system for a wheeled vehicle having braking means, means for sensing incipient lock-up of a braked wheel comprising
means responsive to wheel rotation for producing a speed signal as a function of wheel speed,
differentiating means responsive to the speed signal for producing a deceleration signal as a function of wheel deceleration,
means for producing a variable bias signal as an approximate function of vehicle deceleration,
time integrator means responsive to the variable bias signal and the deceleration signal to provide an output signal representing the difference between the approximate vehicle velocity and the wheel velocity, thereby providing a measure of incipient wheel lock-up
and means responsive to the output signal for alternately releasing and applying the wheel braking means to thereby cause the wheel to cyclically accelerate and decelerate, the wheel deceleration normally being in substantial synchronism with vehicle deceleration during a portion of the time when braking means is applied
the means for producing a variable bias signal including a differentiator means responsive to the speed signal for producing a wheel deceleration signal, means responsive to the wheel deceleration signal for sampling vehicle deceleration during the time the wheel deceleration is in substantial synchronism with the vehicle deceleration and generating the bias signal as a function of the vehicle deceleration including means for limiting the bias signal to a range of values representing zero to a predetermined maximum vehicle deceleration, and time delay means for causing the bias signal to lag the wheel deceleration.

5. In an anti-lock brake control system for a wheeled vehicle having wheel braking means, means for sensing incipient lock-up of a braked wheel comprising
means responsive to wheel rotation for producing a speed signal as a function of wheel speed,
differentiating means responsive to the wheel signal for producing a deceleration signal as a function of wheel deceleration,
means for producing a variable bias signal as an approximate function of vehicle deceleration,
time integrator means responsive to the variable bias signal and the deceleration signal to provide a velocity error signal representing the difference between the approximate vehicle velocity and the wheel velocity, thereby providing a measure of incipient wheel lock-up,
and comparator means responsive to the value of the velocity error signal for alternately releasing and applying the wheel braking means as the velocity error signal varies to thereby cause the wheel to cyclically accelerate and decelerate, the wheel deceleration normally being in substantial synchronism with vehicle deceleration during a portion of the time when braking means is applied,
the means for producing a variable bias signal including means responsive to wheel deceleration for sampling wheel deceleration during the time the wheel deceleration is in substantial synchronism with the vehicle deceleration and for generating the bias signal as a function of the vehicle deceleration, and time delay means for causing the bias signal to lag the wheel deceleration,
and means operative while the braking means is released for preventing increase of the bias signal beyond a predetermined value, thereby limiting the effect of the wheel deceleration on the bias signal while the braking means is released.

6. In an anti-lock brake control system for a wheeled vehicle having wheel braking means, means for sensing incipient lock-up of a braked wheel comprising
means responsive to wheel rotation for producing a speed signal as a function of wheel speed,
differentiating means responsive to the wheel signal for producing a deceleration signal as a function of wheel deceleration,
means for producing a variable bias signal as an approximate function of vehicle deceleration,
time integrator means responsive to the variable bias signal and the deceleration signal to provide a velocity error signal representing the difference between the approximate vehicle velocity and the wheel velocity, thereby providing a measure of incipient wheel lock-up,
comparator means responsive to the value of the velocity error signal for alternately releasing and applying the wheel braking means as the velocity error signal varies to thereby cause the wheel to cyclically accelerate and decelerate, the wheel deceleration normally being in substantial synchronism with vehicle deceleration during a portion of the time when braking means is applied, the means for producing a variable bias signal including means responsive to wheel deceleration for sampling wheel deceleration during the time the wheel deceleration is in substantial synchronism with the vehicle deceleration and for generating the bias signal as a function of the vehicle deceleration, and time delay means for causing the bias current to lag the wheel deceleration, and means connected to the integrator means for supplying a further bias signal to the integrator means during periods of high wheel velocity comprising a circuit responsive to the speed signal and the variable bias signal for producing a variable output signal as a function of wheel speed and vehicle deceleration thereby rendering the means for sensing incipient lock-up less sensitive at high speeds by an amount dependent on the wheel speed and the road coefficient of friction.

7. In an anti-lock brake control system for a wheeled vehicle having wheel braking means, means for sensing incipient lock-up of a braked wheel comprising means responsive to wheel rotation for producing a speed signal as a function of wheel speed, differentiating means responsive to the speed signal for producing a deceleration signal as a function of wheel deceleration, means for producing a variable bias signal as an approximate function of vehicle deceleration, time integrator means responsive to the variable bias signal and the deceleration signal to provide a velocity error signal representing the difference between the approximate vehicle velocity and the wheel velocity, thereby providing a measure of incipient wheel lock-up, comparator means responsive to the value of the velocity error signal for alternately releasing and applying the wheel braking means as the velocity error signal varies to thereby cause the wheel to cyclically accelerate and decelerate, the wheel deceleration normally being in substantial synchronism with vehicle deceleration during a portion of the time when braking means is applied, the means for producing a variable bias signal including means responsive to wheel deceleration for sampling wheel deceleration during the time the wheel deceleration is in substantial synchronism with the vehicle deceleration and for generating the bias signal as a function of the vehicle deceleration, and time delay means for causing the bias signal to lag the wheel deceleration, and means for terminating the release of the wheel braking means comprising a circuit responsive to wheel acceleration for producing an output when the wheel exceeds a predetermined positive acceleration and for applying the output to the comparator means to override the velocity error signal and effect application of the wheel braking means.

8. In an anti-lock brake control system for a wheeled vehicle having wheel braking means, means for sensing incipient lock-up of a braked wheel comprising means responsive to wheel rotation for producing a speed signal as a non-linear function of wheel speed, the speed signal being less responsive to changes of wheel speed at high speeds than at low speeds, thereby rendering the system less sensitive at high speeds, differentiating means responsive to the speed signal for producing an acceleration signal as a non-linear function of wheel acceleration, means for producing a variable bias signal as an approximate function of vehicle deceleration, time integrator means responsive to the variable bias signal and the acceleration signal to provide an output signal representing the difference between the approximate vehicle speed and the wheel speed, thereby providing a measure of incipient wheel lock-up, the means for producing a variable bias signal including differentiating means having the speed signal as an input, a high gain amplifier connected to the differentiating means, and time delay means comprising a resistor and a capacitor connected across the amplifier whereby the amplifier produces a current varying according to vehicle deceleration as reflected in the speed signal.

9. An adaptive control anti-lock brake system for a wheeled vehicle having fluid operated brakes, and means for applying fluid pressure to the brakes, comprising means for controlling the fluid pressure including a pressure modulation system for alternately relieving and applying fluid pressure to the brakes in response to an electrical control signal and an electrical control circuit for detecting incipient wheel lock-up and producing the electrical control signal including
  a. means responsive to rotation of at least one wheel for producing a speed signal as a function of wheel speed,
  b. differentiating means responsive to the speed signal for producing a wheel acceleration signal which is a function of wheel acceleration,
  c. a circuit responsive to the speed signal for producing a vehicle deceleration signal which is an approximation of vehicle deceleration,
  d. means for producing a velocity error signal comprising a time integrator responsive to the wheel acceleration signal and the vehicle deceleration signal having an output representative of the difference between approximated vehicle speed and the wheel speed, and
  e. comparator means responsive to predetermined values of the velocity error signal for producing an electrical control signal for control of the pressure modulation system.

10. An adaptive control anti-lock brake system for a wheeled vehicle having fluid operated brakes, and means for applying fluid pressure to the brakes, comprising means for controlling the fluid pressure including a pressure modulation system for alternately relieving and applying fluid pressure to the brakes in response to an electrical control signal and an electrical control circuit for detecting incipient wheel lock-up and producing the electrical control signal including
  a. sensor means responsive to rotation of at least one wheel for producing an output signal as a function of wheel speed, b. a circuit connected by first conductive means to the sensor means and responsive to the output signal for producing a speed signal as a function of wheel speed,
c. differentiating means responsive to the speed signal for producing a wheel acceleration signal which is a function of wheel acceleration,
d. a circuit responsive to the speed signal for producing a wheel deceleration signal which is an approximation of vehicle deceleration,
e. means for producing a velocity error signal comprising a time integrator responsive to the wheel acceleration signal and the vehicle deceleration signal having an output representative of the difference between approximated vehicle speed and the wheel speed, and
f. comparator means responsive to the predetermined value of the velocity error signal for producing a control signal for control of the pressure modulating system, second conductive means for connecting the comparator means to the pressure modulation system, and a failsafe circuit responsive to shorts and open circuit failure in the first and second conductive means and connected to the electrical control circuit for disabling the electrical control means to therefore permit brake application in the event of a failure in the conductive means.

11. An adaptive anti-lock brake system as defined in claim 10 wherein the failsafe circuit comprises a logic circuit responsive to failures in the conductive means and producing a failure signal in the event of a failure, and a time delay circuit responsive to the failure signal from the logic circuit for producing an output after receiving a sustained failure signal for a predetermined time, and means responsive to the output for disabling the electrical control circuit.

12. An adaptive control anti-lock brake system as defined in claim 11 including means for producing a release signal when the pressure modulation system relieves fluid pressure to the brakes, means in the electrical control circuit for producing a mode signal when the electrical control circuit is not in anti-lock operation, and a second logic circuit responsive to the release signal and the mode signal for producing an output signal when both the release signal and the mode signal are received, the output signal being fed to the first-mentioned logic circuit to effect a failure signal.

13. In an anti-lock brake control system for a wheeled vehicle having wheel braking means, means for sensing incipient lock-up of a braked wheel comprising
means for producing a first signal which is a function of wheel acceleration,
means responsive to wheel acceleration for producing a second signal which approximately simulates vehicle deceleration,
means for time integrating the difference between the first and second signals to provide an output signal proportional to the difference between simulated vehicle velocity and wheel velocity, the output signal thereby providing a means of sensing incipient wheel lock-up,
means responsive to the output signal for alternately releasing and applying the wheel locking means,
and means operative while the braking means is released for preventing increase of the second signal beyond a predetermined value, thereby limiting the effect of the wheel acceleration of the second signal while the braking means is released.

14. In an anti-lock brake control system for a wheeled vehicle having wheel braking means, means for sensing incipient lock-up of a braked wheel comprising
means for producing a first signal which is a function of wheel acceleration,
means responsive to wheel acceleration for producing a second signal which approximately simulates vehicle deceleration,
means for time integrating the difference between the first and second signals to provide an output signal proportional to the difference between simulated vehicle velocity and wheel velocity, the output signal thereby providing a means of sensing incipient wheel lock-up,
means responsive to the output signal for alternately releasing and applying the wheel locking means,
and means operative while the braking means is released for preventing increase of the second signal beyond a predetermined value when the second signal is below the predetermined value at the time of brake release, and for preventing increase of the second signal when the second signal is above the predetermined value at the time of release, thereby limiting the effect of the wheel acceleration on the second signal while the braking means is released.

15. In an anti-lock brake control for a wheeled vehicle having wheel braking means, comprising
sensing means for sensing braked wheel speed to produce a wheel speed signal,
a control circuit responsive to wheel speed for sensing incipient wheel lock, the control circuit having a capacitive input impedance,
and means for reducing ripple in the speed signal comprising a dual conductance circuit between the sensing means and the control circuit for providing, in combination with the capacitive impedance of the control circuit, a filtering action only on speed signal variations representing speed increases,
whereby filtering of the speed signal is accomplished without diminishing the sensitivity and response of the control circuit to wheel deceleration.

16. In an anti-lock brake control for a wheeled vehicle having wheel braking means, comprising
sensing means for sensing braked wheel speed to produce a wheel speed signal,
a control circuit responsive to wheel speed for sensing incipient wheel lock, the control circuit having a capacitive input impedance,
and a parallel combination of a resistor and a diode connecting the sensing means and the control circuit, the diode polarity being such that speed signal variations corresponding to wheel deceleration are passed by the diode to the control circuit and speed signal variations corresponding to wheel acceleration are passed through the resistor which, in combination with the said capacitive impedance, provides a filtering action only on the signal variations representing speed increases, whereby filtering of the speed signal is accomplished without diminishing the sensitivity and response of the control circuit to wheel deceleration.

17. The method of decelerating a wheeled vehicle moving on a surface comprising the steps of
applying to a wheel sufficient brake action to cause the wheel to exceed its maximum braking force under at least some surface conditions,
simultaneously measuring the wheel deceleration,
generating from said measurement a time-delayed signal,
comparing said signal with said measurement to obtain a difference signal,
time integrating the difference signal, and
releasing the brake action when the integrated difference signal exceeds a predetermined value.

18. The method of decelerating a wheeled vehicle moving on a surface comprising the steps of
applying to a wheel sufficient brake action to cause the wheel to exceed its maximum braking force under at least some surface conditions,
simultaneously measuring the wheel deceleration,
generating from said measurement a time-delayed signal,
comparing said signal with said measurement to obtain a difference signal,
time integrating the difference signal,
releasing the brake action when the integrated difference signal exceeds a predetermined value,
continuing said comparison and integration after brake release, and
restoring brake action when the integrated difference signal attains a preset value.

19. The method of decelerating a wheeled vehicle moving on a surface comprising the steps of
applying to a wheel sufficient brake action to cause the wheel to exceed its maximum breaking force under at least some surface conditions,
simultaneously measuring the wheel deceleration,
generating from said measurement a time-delayed signal,
comparing said signal with said measurement to obtain a difference signal,
time integrating the difference signal,
releasing the brake action when the integrated difference signal exceeds a predetermined value,
continuing said comparison and integration after brake release,
restoring brake action when the integrated difference signal attains a preset value,
measuring wheel acceleration occurring after the release of brake action, and
restoring the brake action when the wheel acceleration exceeds a predetermined value should such value be attained before the integrated difference signal attains the preset value.

20. The method of decelerating a wheeled vehicle moving on a surface comprising the steps of
a. applying to a wheel sufficient brake action to cause the wheel to exceed its maximum braking force under at least some surface conditions,
b. simultaneously measuring the wheel deceleration,
c. generating from said measurement a time-delayed signal,
d. comparing said signal with said measurement to obtain a deceleration difference,
e. time integrating the difference,
f. releasing the brake action when the integrated difference exceeds a predetermined value,
g. measuring wheel recovery as a function of wheel speed,
h. restoring brake action after a determinable amount of wheel recovery, and
i. repeating the steps b through h to cyclically release and restore brake action.

* * * * *